Feb. 12, 1929.
C. D. PARSONS
AUTOMOBILE ACCESSORY
Filed Jan. 12, 1928
1,701,696
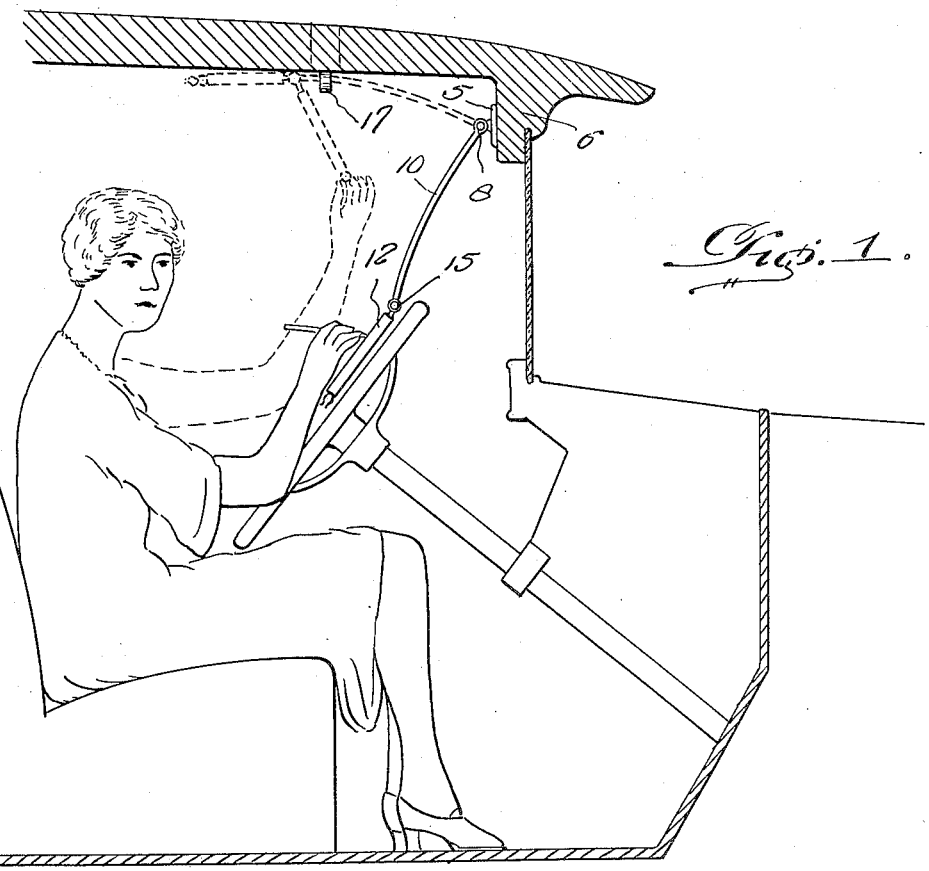
Fig. 1.
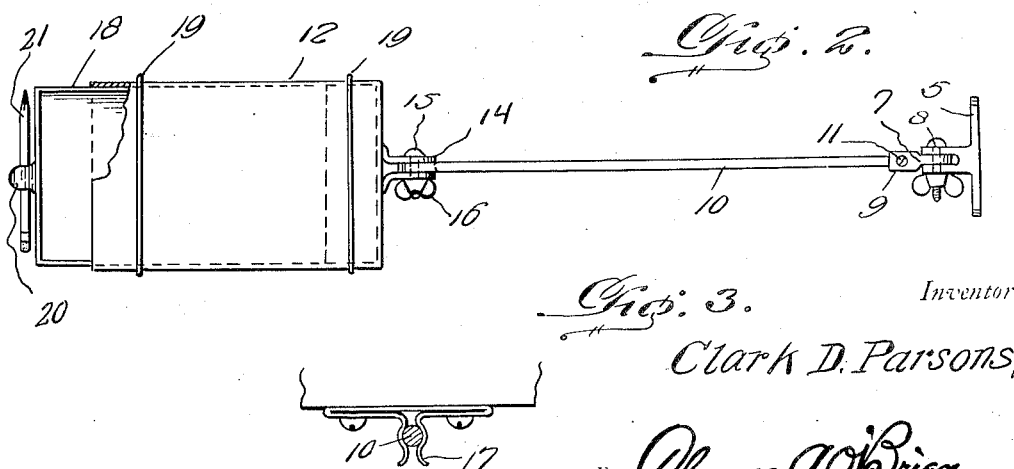
Fig. 2.
Fig. 3.
Inventor
Clark D. Parsons,
By Clarence A. O'Brien
Attorney Patented Feb. 12, 1929.

1,701,696

UNITED STATES PATENT OFFICE.

CLARK D. PARSONS, OF ORLANDO, FLORIDA.

AUTOMOBILE ACCESSORY.

Application filed January 12, 1928. Serial No. 246,357.

The present invention relates to an automobile accessory holder attachment for use as a map or memoranda holder and has for its prime object to provide a device of this nature consisting of a movable arm supported on the windshield frame and means for holding the arm in an out of the way position, and a holder hingedly mounted on the free end of the arm in such a manner that it may be swung out of the way or disposed in a position to be readily observed by the driver of the automobile, the arm and the holder being swingable down so that the holder may be rested on the steering wheel for writing purposes.

A still further very important object of the invention resides in the provision of an accessory of this nature which will in no way obstruct the view of the person driving the automobile when the arm is swung upwardly and held in this position with the holder depending therefrom.

Another object of the invention resides in the provision of an accessory of this nature which is exceedingly simple in its construction, inexpensive to manufacture, convenient and easy to handle, thoroughly efficient and reliable for the purpose intended.

With the above and numerous other objects in view as will appear as the description proceeds, the invention resides in certain novel features of construction and in the combination and arrangement of parts as will be hereinafter more fully described and claimed.

In the drawing:

Figure 1 is a fragmentary vertical longitudinal section through an automobile showing the driver's compartment thereof with my improved attachment mounted in place, Figure 2 is a top plan view of the accessory and Figure 3 is a detail view showing the clip with the arm therein in section.

Referring to the drawing in detail it will be seen that the numeral 5 denotes the bracket which is attached to the upper windshield frame or to the inside of the top of the car as at 6. A member 7 is hingedly mounted on the bracket 5 by means of a bolt 8 and has a socket portion 9 receiving one end of an arm or rod 10 which is held in adjusted position by means of a set screw 11. The numeral 12 denotes a casing having a pair of straight parallel ears 14 projecting from one end thereof and receiving therebetween the other end of the arm 10 which is hingedly mounted therebetween by means of a bolt 15 having a wing nut 16 thereon so that the ears may be brought into frictional and binding engagement with the arm 11 to hold the casing at different angles with respect to the arm. On the top of the automobile there is mounted a clip 17 of the spring type with which the arm 10 may engage as is indicated in dotted lines in Figure 1 for holding the casing up underneath the top or depending downwardly therefrom. A drawer 18 is slidable in the casing 12 and may be used to hold extra maps or data sheets or suitable writing pads for memoranda purposes depending on the requirements of user. Elastic bands 19 are provided for holding maps in position on outside of casing where they will be convenient for observing by driver. The free end of the drawer is provided with a clip 20 for the purpose of holding a pencil 21 or the like.

From the above detailed description it will be seen that the arm may be swung downwardly from engagement with the clip 17 so that the casing and drawer may be disposed in proximity to the steering wheel so that a person may use the casing as backing for writing on pads therein or make notations on a map thereon.

From the above detailed description it will be seen that the attachment may be used as a convenient and accessible map holder, to serve as a small writing table for making notes, keeping track of gas and oil usage or other useful data in such form as to be readily accessible when needed and yet out of the way when not in use.

When used as a map holder the same may be readily observed by the driver of the automobile as it hangs down from the end of the arm 10 when said arm is engaged in the clip 17.

It is thought that the construction, utility, operation and advantages of the invention will now be quite apparent to those skilled in this art without a more detailed description thereof.

The present embodiment of the invention has been disclosed in detail merely by way of example since in actual practice it attains the features of advantage enumerated as desirable in the statement of the invention and the above description. It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

1. In an automobile accessory of the class described, a bracket for attachment to the upper portion of a windshield frame, an arm hingedly engaged at one end with the bracket, a holder, means hingedly engaging the holder with the other end of the arm, means for holding the holder at different adjusted angles with respect to the arm, and a spring clip mounted on the under side of the automobile top for engagement with the arm to hold the arm in an upward out of the way position.

2. In an automobile accessory of the class described, a bracket for attachment to the upper portion of a windshield frame, an arm hingedly engaged at one end with the bracket, a holder, means hingedly engaging the holder with the other end of the arm, means for holding the holder at different adjusted angles with respect to the arm, and a spring clip mounted on the under side of the automobile top for engagement with the arm to hold the arm in an upward out of the way position, said holder comprising a casing and a drawer slidable in the casing.

3. In an automobile accessory of the class described, a bracket for attachment to the upper portion of a windshield frame, an arm hingedly engaged at one end with the bracket, a holder, means hingedly engaging the holder with the other end of the arm, means for holding the holder at different adjusted angles with respect to the arm, and a spring clip mounted on the under side of the automobile top for engagement with the arm to hold the arm in an upward out of the way position, said holder comprising a casing and a drawer slidable in the casing, and elastic bands about the casing for holding maps thereon for observance by the driver.

4. In combination with an automobile body comprising a windshield frame, a top, and a steering wheel, of an accessory comprising a bracket mounted on top of the windshield frame, an arm hingedly engaged with the bracket, a clip mounted on the top for receiving the arm to hold it in an elevated position, and a holder hingedly engaged on the arm, said arm being of sufficient length that the holder may be swung to a position above the steering wheel.

5. In combination with an automobile body comprising a windshield frame, a top, and a steering wheel; of an accessory comprising a bracket mounted on top of the windshield frame, an arm hingedly engaged with the bracket, a clip mounted on the top for receiving the arm to hold it in an elevated position, and a holder hingedly engaged on the arm, said arm being of sufficient length that the holder may be swung to a position above the steering wheel, and means for disposing the holder at different adjusted angles with respect to the arm.

6. In combination with an automobile body comprising a windshield frame, a top, and a steering wheel; of an accessory comprising a bracket mounted on top of the windshield frame, an arm hingedly engaged with the bracket, a clip mounted on the top for receiving the arm to hold it in an elevated position, and a holder hingedly engaged on the arm, said arm being of sufficient length that the holder may be swung to a position above the steering wheel, and means for disposing the holder at different adjusted angles with respect to the arm, said holder comprising a casing, elastic bands about the casing for holding a map thereon for observance by the driver, and a drawer slidable in the casing for containing extra maps, memoranda or other data.

In testimony whereof I affix my signature.

CLARK D. PARSONS.